United States Patent Office.

JAMES B. HAGGIN AND WILLIAM IRELAN, JR., OF SAN FRANCISCO, CAL.

SHEEP-WASH.

SPECIFICATION forming part of Letters Patent No. 250,352, dated December 6, 1881.

Application filed December 20, 1880. (No specimens.)

*To all whom it may concern:*

Be it known that we, JAMES B. HAGGIN and WILLIAM IRELAN, Jr., both of the city and county of San Francisco, in the State of California, have invented an Improved Sheep-Wash; and we do hereby declare that the following is a full, clear, and exact description thereof.

Our invention relates to an improved sheep-wash consisting of sulphur and lime combined with some saccharine matter—such as sugar, molasses, or other non-drying agent—the whole mixed with and boiled in a suitable quantity of water to reduce it to the desired consistence. The proportions of each of these ingredients will be varied according to the nature and character of the disease it is desired to cure.

For ordinary purposes a wash compounded according to the following formula will be sufficient; but we wish it distinctly understood that we do not confine ourselves to the proportions given: sulphur, thirty-one pounds; lime, forty-one pounds; saccharine matter, four pounds; water, one hundred gallons.

This wash will cure scab and other parasitical diseases in sheep and other animals, and is also a valuable curative agent for all kinds of skin diseases.

We are aware that sulphuret of calcium, either alone or combined with other ingredients, has been used as a mange lotion, and we do not claim the use of such materials. We are not, however, aware that it has ever been contemplated to form a wash composed of sulphuret of calcium and saccharine matter.

It has been found in practice that the use of sulphuret of calcium is very injurious to the skin, causing it to crack and become sore. By the addition of the saccharine matter the cracking of the skin is entirely avoided and the utility of the sulphuret of calcium greatly enhanced, and it can be used much more generally and safely than where saccharine matter or its equivalent is omitted.

Having thus described our invention, what we claim, and desire to secure by Letters Patent, is—

A sheep-wash composed of sulphur, lime, and saccharine matter boiled in a suitable quantity of water, substantially as specified.

In witness whereof we have hereunto set our hands.

J. B. HAGGIN.
WM. IRELAN, JR.

Attest:
WM. F. CLARK,
EDWARD E. OSBORN.